United States Patent [19]

Torii et al.

[11] 3,712,425
[45] Jan. 23, 1973

[54] AUTOMATIC ADJUSTER FOR A BRAKE CLEARANCE

[75] Inventors: Tatsumi Torii; Haruo Miyajima, both of Kariya, Japan

[73] Assignee: Aisin Seiki Co. Ltd., Aichi-ken, Japan

[22] Filed: Jan. 8, 1971

[21] Appl. No.: 105,078

Related U.S. Application Data

[63] Continuation-in-part of Ser. No. 822,210, May 6, 1969, abandoned.

[30] Foreign Application Priority Data

May 6, 1968 Japan..............................43/30160

[52] U.S. Cl. .....................188/79.5 GE, 188/196 BA
[51] Int. Cl................................................F16d 65/56
[58] Field of Search .......188/79.5 K, 79.5 M, 79.5 P, 188/79.5 GL, 79.5 GE, 79.5 GT, 196 BA

[56] References Cited

UNITED STATES PATENTS

| 2,389,618 | 11/1945 | Goepfrich | 188/79.5 GE |
| 3,126,074 | 3/1964 | Swift | 188/79.5 GC |
| 3,294,202 | 12/1966 | Helvern | 188/79.5 GC |

*Primary Examiner*—Duane A. Reger
*Attorney*—Sughrue, Rothwell, Mion, Zinn & Macpeak

[57] ABSTRACT

The present invention is directed toward an automatic brake clearance adjusting means incorporating a connecting lever slidably connected with a ratchet wheel adjusting lever, said ratchet wheel adjusting lever being biased to rotate the ratchet wheel to adjust the brake clearance when the brakes are applied and said connecting lever acting to return the adjusting lever to a predetermined initial position when the brake shoes are returned to their non-apply position. The slidable connection enables the connecting lever to move relative to the adjusting lever when the brakes are applied and means are sufficient to prevent the adjusting lever from being biased to rotate the ratchet wheel.

7 Claims, 6 Drawing Figures

AUTOMATIC ADJUSTER FOR A BRAKE CLEARANCE

CROSS-REFERENCE TO RELATED APPLICATION

This is a continuation-in-part application of Ser. No. 822,210, filed May 6, 1969, now abandoned.

BACKGROUND OF THE INVENTION

This invention relates to improvements in and relating an automatic brake clearance adjusting means having an excess brake clearance adjustment preventing mechanism and a wearing limit indicator combined therewith and for use in powered vehicle brake systems, said automatic clearance adjuster having its object to maintain the brake clearance at a substantially constant value.

The main object of the present invention is to provide an automatic brake clearance adjuster capable of preventing the defective tendency of connectional automatic adjusting means to generally provide a smaller brake clearance than the design value because of elliptic deformation of the brake drum when the brake shoes are applied thereto when the braking action is brought into effect at the desired time.

A further object of the present invention is to provide said kind of automatic adjustor which is of simple and compact construction, easy and economical to manufacture and yet is very durable and reliable.

These and other objects, features and advantages of this invention will appear more specifically in the following description and claims, with reference being made to the accompanying drawings forming a part of this specification wherein like reference characters designate corresponding parts in the several views.

Figure 1:
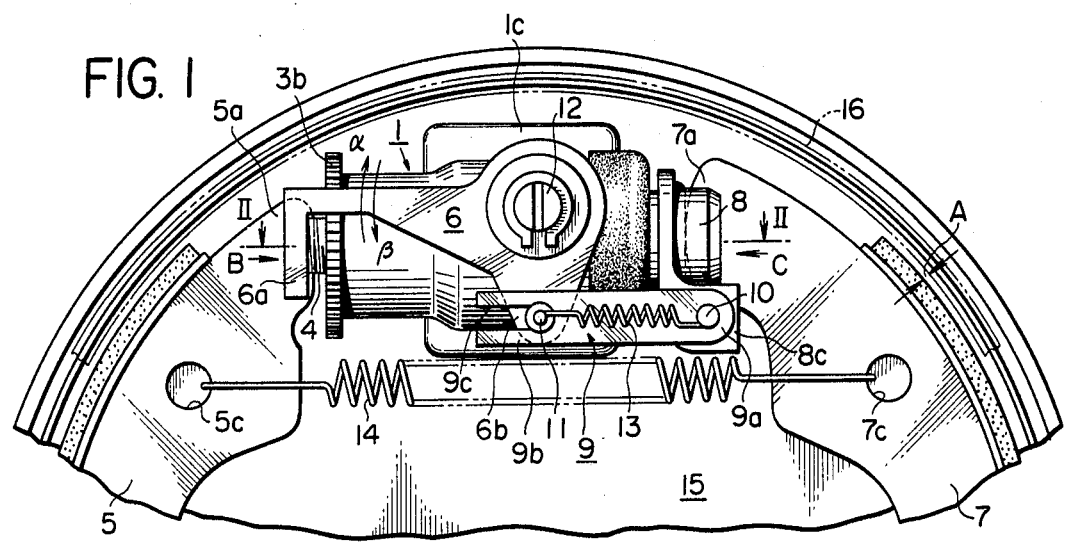
FIG. 1 is a partial section of a front view of the first embodiment of the present invention.
Figure 2:
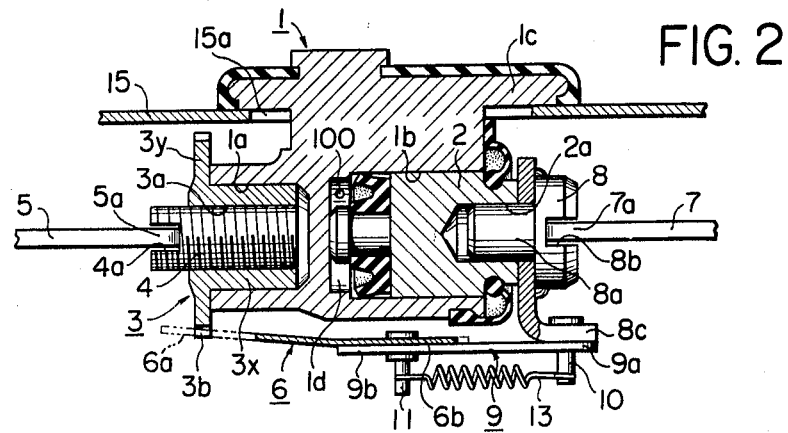
FIG. 2 is a cross-sectional view of essential parts shown in FIG. 1.

Referring now to the accompanying drawings, especially FIGS. 1 and 2 thereof, the numeral 1 denotes a conventional hydraulic wheel cylinder having blind axial bores 1a and 1b formed at both ends, an actuating piston 2 being reciprocably mounted in the latter bore 1b. Adjusting nut 3 is rotatably mounted with its stem 3x in the former bore 1a, while the nut proper 3y is made integral with said stem and formed with a number of engageable teeth 3b on its peripheral surface. This adjusting nut 3 may be referred to as "the ratchet wheel" when its functional operation is to be stressed. The nut 3 is formed with an axial female threaded bore 3a which threadedly receives an adjusting bolt 4 which extends therefrom a small distance. An adjusting lever 6, has its resilient free end 6a shown only schematically by chain lines in FIG. 2 in engagement with one of said teeth 3b. The outer or projecting end of the adjusting bolt 4 is formed with a recess 4a with which a conventional brake shoe 5, only partially shown, is kept in engagement at its one end 5a.

The actuating piston 2 is formed at its outer end with an axial blind bore 2a receiving slidably a stepped piston head 8. The enlarged part of said stepped piston head is formed with a lateral groove 8b which is kept in engagement with another conventional brake shoe 7 at its one end 7a. The stem or reduced part 8a of said piston head 8 has an L-shaped piece 8c mounted thereon, the latter being held between the piston head 8 and the actuating piston 2. A connecting lever 9 has one end 9a pivotably connected with said L-shaped 8 by means of a pivot pin 10.

The other end 9b of connecting lever 9 is formed with a guide slot 9c therein and slidably receiving therealong a pin 11 which is fixedly mounted on another end 6b of said adjusting lever 6. A spring 13 is connected at one end with said pivot pin 10. The other end of said spring 13 is attached to said pin 11 on adjusting lever 6.

Adjusting lever 6 is pivotally mounted on the cylinder 1 by means of a pin 12. The projection 1c extending upwards from the main part of the cylinder 1, as seen in FIG. 2, is kept in slidable engagement with a slot 15a formed through a conventional backing plate 15. Return spring 14 is bridged under tension between an opening 5c formed through brake shoe 5 and a second opening 7c formed through the second shoe 7. By this arrangement, the cylinder 1 is generally squeezed by the oppositely arranged brake shoes 5 and 7.

The operation of the first embodiment mechanism so far shown and described is as follows:

In the off-service position of the arrangement shown in FIGS. 1 and 2, wherein no hydraulic pressure is supplied to cylinder space 1d through port 100, the upper end 5a of the shoe 5 is kept in pressure engagement with recess 4a of threaded member 4 and the upper end 7a of the opposite shoe 7 is kept in indirect contact with the inner end of bore 1b through the actuating head 8 of piston 2, since the shoe ends 5a and 7a are pulled toward each other by a return spring 14 bridged therebetween under tension. As was referred previously, the cylinder 1 is movably mounted on the backing plate 15 along slot 15a. Pin 11 is kept in pressure engagement with the inner bottom of the slot 9c formed between the fork fingers 9b of connecting lever 9, thereby keeping the actuating arm end 6a of adjusting lever 6 in its out-of-engagement position from teeth 3b on ratchet wheel 3.

When the brake is to be applied, liquid under pressure is supplied from a conventional master cylinder, not shown, to the working cylinder chamber at 1d through a port 100 and the actuating piston 2 will move to the right as seen in FIG. 2, while the cylinder 1 will move leftwards while sliding along the slot 15a in the backing plate 15. Brake shoes 5 and 7 are also actuated and urged against the brake drum 16 for performing the desired braking action.

When it is assumed that there is a medium brake gap amounting to a certain value A between the shoe 5 or 7 and the brake drum 16 but less than an amount requiring adjustment, wherein the gap-correcting operation can not be brought about, the operation will be as follows.

Hydraulic pressure will be conveyed again through port 100 into the cylinder space 1d and the piston 2 will be moved rightwards in FIG. 2, while the cylinder body 1 will be moved leftwards under the influence of the hydraulic action. Thus, the shoes 5 and 7 are expanded outwardly against the action of spring 14, until the shoes have been brought into pressure and sliding contact with the brake drum 16 so as to fill the gap A. During this brake applying operation, piston 2 and cylinder body 1 are moved in opposite directions to each other. During this shoe-applying operation, lever 6 is pivoted about its pivot 12 and in a counter-clockwise direction shown by an arrow beta due to the influence of increased tension in spring 13. This pivotal movement of lever 6 is performed, in this case, within one pitch of the teeth 3b. Therefore, no rotation of wheel 3 is invited by the pivotal movement of said lever 6. The lever 6 is then rotated to its original position in the direction alpha by engagement of pin 11 with connecting lever 9.

In practice, however, the brake drum 16 may be subjected to a distortion from its true cylindrical shape by considerable pressure and heat developed during the braking application of the shoes onto the drum which phenomenon gives rise to pivoting the lever 6 beyond the prescribed value due to the additional expansion of shoes 5 and 7. At the moment of pressure and braking contact of the shoes 5 and 7 with drum 16, however, reaction forces will be transmitted therefrom to the shoes, with the force being transferred to the threadedly engaging part 3a between bolt 4 and wheel 3, thus causing a considerable increase in mechanical friction being developed thereat and providing a powerful resistance against any rotation of the wheel 3 by the said pivotal movement of the lever 6 now in mesh with ratchet teeth 3b formed on the wheel 3. Therefore, instead of rotating wheel 3, spring 13 is elongated and tensioned, and the pinned arm end 6b of lever 6 is physically separated from contact with connecting member 9. With normally encountered distortion of the brake drum 16 in the above-noted sense, the wheel 3 can not be rotated when the hydraulic pressure supplied from the master cylinder to the cylinder chamber 1d is released, and the increasingly tensioned return spring 14 will act to move piston 2 and cylinder body 1 in their mutually contracting direction, until they are restored to their original positions shown in FIG. 2. During this return movement, the relative movement caused by the contraction between piston 2 and cylinder body 1 will cause connecting member 9 to again contact pin 11 and act to rotate the lever 6 in the opposite direction shown by arrow alpha, thereby bringing the actuating arm end 6a of the lever 6 to its separated position a prescribed distance from ratchet teeth 3a. Thus, lever 6 has been returned to its original position shown in FIG. 2. At this time, spring 13 is also loosened so as to have its regular or prescribed initial tension.

When the brake gap A becomes larger than the prescribed design value due to excess wear of the brake shoes such that the relative movement between piston 2 and cylinder body 1 during the brake application is larger than the prescribed value, the amount of pivotal movement of said lever 6 by the increased tension of spring 13 in the direction beta becomes larger than the prescribed value. The actuating arm end 6a of lever 6 will act through engagement with ratchet teeth 3a on wheel 3, so as to rotate the latter by an amount corresponding to the excess wear of brake shoes. By this partial rotation of wheel 3, the threaded bolt 4 is turned relatively in the direction necessary for correspondingly projecting out of the threaded bore 3a and providing a compensation for the excess shoe wear.

When the pressure liquid prevailing in the working chamber 1d of cylinder 1 is released, the actuating piston head 8 will perform a leftward sliding movement, while the cylinder 1 will slide rightwards under the influence of return spring 14, thereby causing adjusting lever 6 to be rotated in the direction of alpha shown in FIG. 1 by the connecting lever 9. Thus, adjusting lever end 6a will shift to the next adjoining tooth 3b on the adjusting nut 3. As stated above, upon repeating the aforementioned operation several times, the brake clearance A will be adjusted to the optimum design value. This wear compensating action is repeatedly performed during the brake applying and expanding stroke of the shoes until they are brought into pressure contact with the brake drum 16. However, when, upon application of the brakes, the piston and cylinder body are relatively separated, an additional amount corresponding to the distortion of the brake drum 16, as discussed previously, a substantially appreciable frictional resistance will act at the threadedly engaging portion between bolt 4 and threaded bore 3a again as before, thereby preventing rotation of wheel 3 by lever 6 and spring 13. By virtue of reaction forces, the brake drum 16 will act so as to contract the brake shoes 5 and 7 as indicated by arrows B and C. Therefore, the adjusting nut 3 which is kept in meshing relation with adjusting bolt 4 is not rotated, by virtue of the considerable amount of said reaction forces. The adjusting lever 6 cannot easily rotate the nut 3 on account of their specific construction. On the contrary, the connecting link 9 will slide rightwards against the action of spring 13 and cause adjusting lever 6 to pivot in the direction alpha to its initial position. Thus, the brake clearance is kept at its design value A, and the thermal and mechanical distortion appearing in the brake drum 16 does not invite in any way unintentional rotation of the wheel 3 in the shoe-returning stroke.

It will be clear from the foregoing that with the present embodiment adapted for maintaining the brake clearance always at a predetermined value, an excess or over-adjusting of the clearance over the initially established value can be effectively prevented during the entire automatic adjusting operation so far described.

Figure 3:
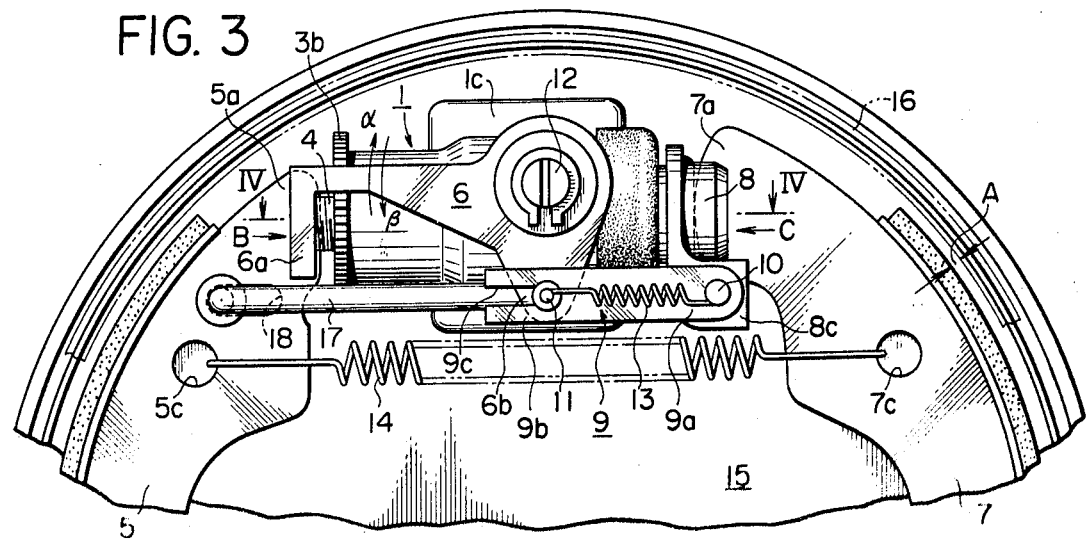
FIG. 3 is a similar view to FIG. 1, showing the second embodiment of the invention.
Figure 4:
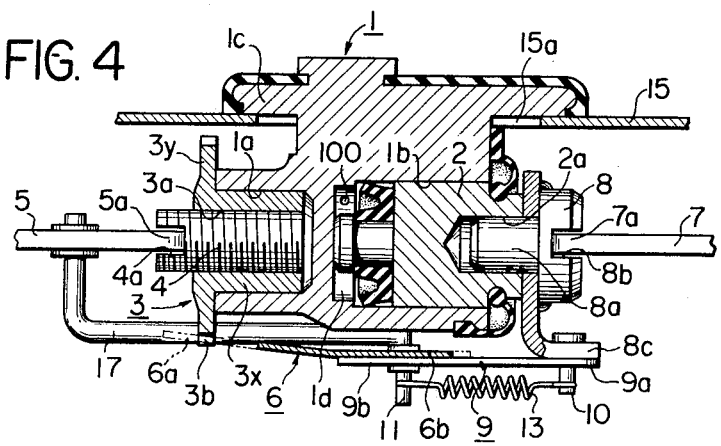
FIG. 4 is a similar view to FIG. 2, showing a cross-section of essential parts of the second embodiment shown in FIG. 3.

Next, referring to FIGS. 3–4, the second embodiment of the invention will now be described. In this embodiment, the pin secured to the end 6b of adjusting lever 6 has been dispensed with. Instead, one end 11 of a connecting member 17 projects through a hole in the end 6b of adjusting lever 6 and is kept in slidable engagement with the forked end 9c of the member 9, and is connected to the end of spring 13 for biasing adjusting lever 6 in the counter-clockwise direction beta. The remaining end of said member 17 is kept in engagement with a slot 18 on brake shoe 5.

Although the foregoing first embodiment has as its object to prevent an excess or over-adjustment in the automatic control of the brake clearance, the present second embodiment is adapted for determining the maximum allowable wear of brake shoes or brake drum, in addition to the aforementioned automatic brake gap adjusting operation. In the arrangement shown in FIGS. 3 and 4, the brake gap adjusting action and brake cylinder distortion compensation are carried out in a similar manner as described above with regard to the first embodiment shown in FIGS. 1 and 2.

In the present embodiment, a safety measure against an excess brake gap adjustment beyond a predetermined value of brake shoe wear is provided. For this purpose, the gap adjusting operation is intentionally stopped when the shoe wear has amounted to a certain prescribed value. In this case, as with the first embodiment, the nut 3 is turned to cause the threaded bolt 4 to project out of the mating threaded bore 3a during the apply and return stroke of the brake shoes as before. After the left-hand end of link 17 has been brought into contact with the inner extremity of slot 18, lever 6 is not allowed to swivel in the direction beta, although any rotation of said lever in the opposite or alpha direction by the connecting member or link 9 is not prevented even under these operational conditions. Therefore, even when a brake gap adjusting operation has been performed under these operational conditions, spring 13 can not influence the lever 6 so as to rotate the latter in the beta direction, thus no rotational movement of the wheel 3 is invited in this case. A further elongation of spring 13 and a further physical separation between lever 6 and link 9 are only invited thereby. The vehicle drive will sense, in this case, an increased brake gap distance over the prescribed value, through his regular operation of the foot-operated brake pedal, not shown, by feeling a correspondingly increased brake pedal stroke.

When such phenomenon as this for the demonstration of a critical wear in the above sense has taken place, the brake shoes and/or brake drum must be replaced by new ones. With the present embodiment, such valuable information can be provided in an easy and highly simplified manner.

Lastly, the third embodiment of the invention will be described by reference to FIGS. 5–6.

Figure 5:
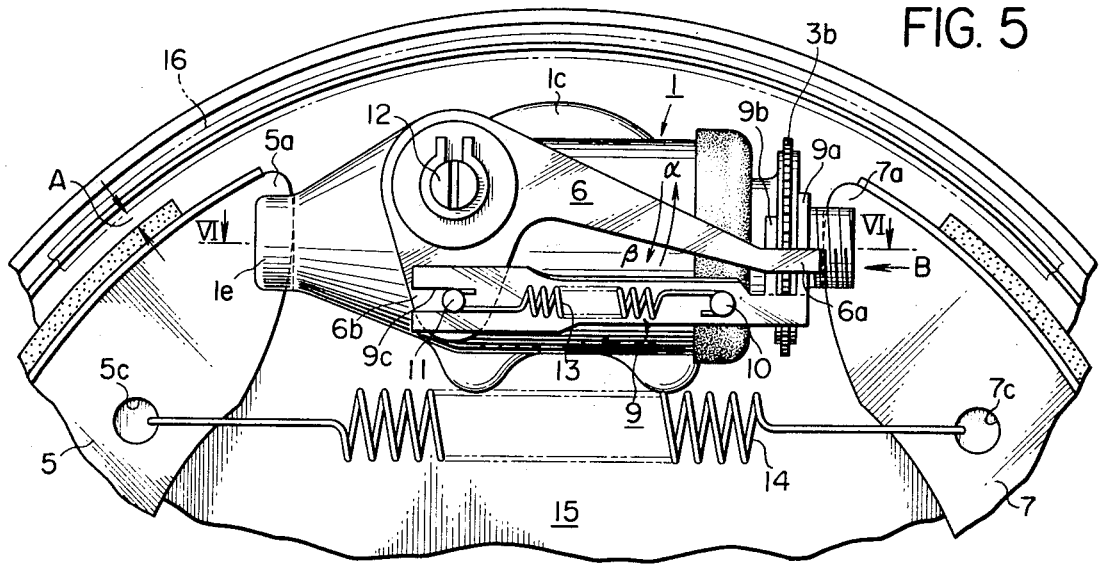
FIG. 5 is a similar view to FIG. 1, illustrating the third embodiment of the invention.
Figure 6:
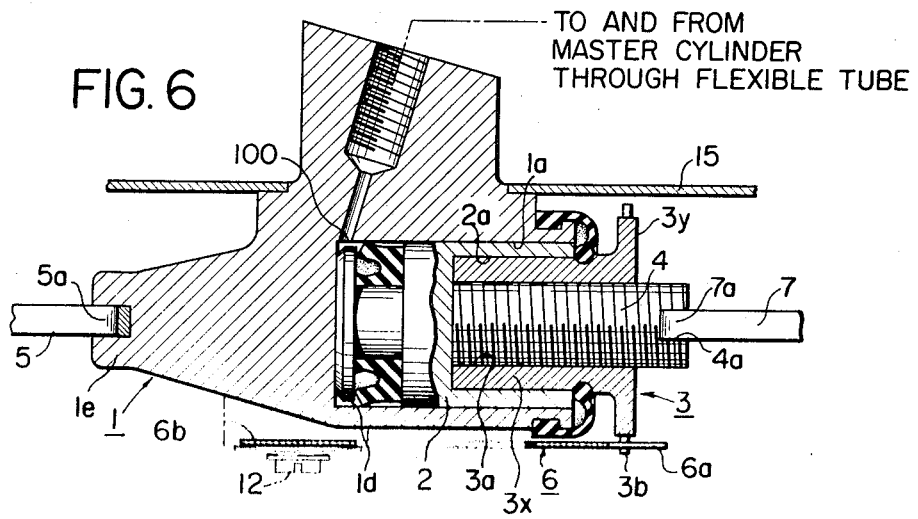
FIG. 6 is a similar view to FIG. 2, showing a cross-section of essential parts shown in FIG. 5.

In the present third embodiment, there are provided two independent hydraulic cylinders on the back plate at an upper and a lower position when seen in FIG. 5 and housed within a single brake drum. The function is dual in the previously described sense. The cylinders are fixedly mounted on the backing plate, each of said cylinders is connected with one of the shoes, while the opposite side of the cylinder is provided with an actuating piston, adjusting bolt and an adjusting nut kept in threaded engagement with the latter.

An adjusting lever 6 is pivotably provided on each of said cylinders. One end 6a of the adjusting lever 6 is kept in engagement with one of the engageable teeth 3b formed on the adjusting nut 3. The other end of said lever is kept in slidable engagement with a connecting lever 9, and with one end of spring means 13 at 11. The opposite end of the connecting lever 9 is kept in engagement with another end of the spring 13 at 10.

Cylinder 1 is fixedly mounted on back plate 15, one end of said cylinder being kept in engagement with one end at 5a of brake shoe 5. Another cylinder end is formed with a longitudinal blind bore 1a in which an actuating piston 2 is slidably mounted. Piston 2 is formed with a longitudinal blind bore 2a which rotatably receives the reduced cylindrical part of adjusting nut 3, as described before. This nut 3 is formed with female-threaded bore 3a which threadedly receives an adjusting bolt 4. One of the engageable teeth 3b is kept in engagement with one end 6a of adjusting lever 6. At the outer end of adjusting bolt 4, there is formed a groove 4a with which one end 7a of brake shoe 7 engages. Adjusting lever 6 is pivotably mounted on the cylinder 1 by means of a pin 12. The rest of the construction is similar to that described before. It should be noted, however, that a second cylinder unit of similar construction is provided on the lower part of the backing plate, although not shown.

The operation of the third embodiment will now be described.

Prior to the braking application, no master cylinder pressure is applied to the cylinder space 1d, and piston 2, adjusting nut 3 and bolt 4, are, as a whole, maintained in the return position in engagement with the innermost end of cylinder bore 1a under the influence of the spring force at 14. The cylinder body 1, in this embodiment is rigid with the backing plate 15.

The actuating arm end 6a is kept separated from the ratchet teeth 3b by a proper distance smaller than one pitch thereof, as before.

When the braking system is actuated in the regular manner, pressure liquid is conveyed from the master cylinder (not shown) as before to the working chamber 1d. The cylinder end at 1e cannot move in any way. Thus, the shoe end 5a will act as a pivot point when seen from another cylinder unit. The actuating piston 2 will slide rightwards, thereby urging the adjusting bolt 4 to move rightwards. The bolt end 4a will act upon the shoe end 7a so as to move the shoe end rightwards for initiating the braking action. One end 9a of connecting member 9 is moved rightwards, by adjusting nut 3 and the lever 6 is pivoted in the direction denoted alpha by the biasing force of spring 13. In this case, if the clearance A between brake drum 16 and brake shoe 7 or 5 is larger than the prescribed value, the rightward moving stroke of piston 2, as well as the rightward shifting of bolt 4, nut 3 and connector 9 is increased correspondingly. Thus, the adjusting lever 6 while being kept in mesh with one of the teeth 3b is rotated in the alpha-direction by the biasing force of spring 13 and the nut 3 is rotated and the bolt 4 will be moved rightwards.

When pressure liquid is released from the working chamber 1d, bolt 4 and its nut 3 will be moved rightward under the influence of return spring 14. Extension end 9b of connecting member 9 will be acted upon by spring 14 so as to move the extension end 6b in the left-hand direction, thus causing the adjusting lever 6 to be rotated in the beta direction. Thus, lever end 6a will override the foregoing tooth and be brought into meshing with a next tooth 3b. Upon repeating the foregoing procedures several times, the gap A could be adjusted over a predetermined value. However, when pressure liquid is supplied from the master cylinder to working chamber 1d, the working piston is moved rightwards and the brake shoe 7 or 5 is engaged with the brake drum 16, whereupon, a forcibly expanding effort is applied to the drum, thereby possibly causing the latter to be subjected to a mechanical deformation. In this case, as previously described, the adjusting lever 6 can not easily rotate the adjusting bolt due to excessive friction. Thus, the forked end 9c of the connecting rod 9 will slide along the pin 11 on lever end 6b and against the force of spring 13 in the right-hand direction. In this way, the brake gap A can be adjusted in a positive manner to the desired optimum value.

When the brake gap is within the prescribed range, no gap-adjusting action can be brought about substantially the same as in the foregoing arrangements. The primary difference is that the cylinder body is stationary in the third embodiment while the piston above is movable so as to provide the required brake gap-adjustment.

Other gap-adjustment and distortion-compensating operations are substantially similar as to the previous embodiments and thus further operational analysis can be omitted without sacrifice of a better understanding of the invention.

What is claimed is:

1. An automatic brake-gap adjustor for automotive vehicle wheel brakes comprising, a stationary backing plate, a pair of brake shoes movably positioned on said backing plate opposite one another, means for expanding said brake shoes into frictional engagement with said brake drums, said expanding means positioned between two adjacent ends of said brake shoes and operatively connected therewith, said automatic brake gap adjustor means including a ratchet means and screw shifting means attached to said expanding means and operably connected with one of said brake shoes, an adjusting lever pivotally mounted on said expandable means, one end of said lever being movably engaged with said ratchet means for actuating said ratchet means, a biasing means having one end thereof connected with said expanding means and the other end thereof operatively connected with another end of said adjusting lever for biasing said adjusting lever to rotate said ratchet means, and a link means having one end thereof operatively connected with said expanding means and the other end thereof slidably engaged with said another end of said adjusting lever for moving said adjusting lever in a direction opposite that caused by said biasing means and simultaneously disengaging said one end of said adjusting lever from said ratchet wheel, the biasing force of said biasing means being increased when said expanding means is actuated, whereby, when an excessive resistance between said ratchet wheel means and said expanding means exceeds a predetermined amount, said expanding means will continue to expand and the position of said adjusting lever will be maintained on said ratchet wheel and said link means will act to return said adjusting lever to its original position when said expanding means is released.

2. Brake gap adjuster assembly as claimed in claim 1, wherein said expanding means comprises a cylinder body and a hydraulically operated piston telescopically mounted therein, said cylinder body being slidably mounted on said stationary backing plate, said screw shifting means includes a ratchet wheel and a threaded adjusting bolt, said ratchet wheel having ratchet teeth formed on its outer periphery and being rotatably mounted on said cylinder body, said adjusting bolt being maintained in threaded engagement with said ratchet wheel said adjusting lever being pivotably mounted on said cylinder body and having an elastic arm adapted for engagement with said ratchet teeth and a second arm having a pin rigidly formed thereon, said pin being maintained in sliding engagement with a groove formed at one end of said link means, and said biasing means being tensioned between said pin and said link means.

3. Brake gap adjuster assembly as claimed in claim 2, further comprising, a connecting member connected between said second arm of said adjusting lever and a slot formed in one of said brake shoes for defining the operational range of said automatic brake gap adjuster means.

4. Automatic brake gap adjuster assembly as claimed in claim 2, wherein said ratchet means and screw shifting means are positioned on the end of said hydraulic cylinder opposite said hydraulic piston, and said link means comprises an L-shaped member mounted on a stepped piston head piece mounted on the end of said hydraulic piston in engagement with said brake shoe, and a connecting bar connected by means of a pivot pin with said L-shaped member.

5. Automatic brake gap adjuster assembly as claimed in claim 1, wherein a ratchet wheel is rotatably mounted in a bore formed in one end of a hydraulic piston, an adjusting bolt is kept in threaded engagement with said ratchet wheel, said adjusting lever is pivotably mounted on said cylinder body and has a first elastic arm adapted for engagement with teeth formed on said ratchet wheel and a second arm having a projection pin kept in slidable engagement with a slot formed in one end of said link means, said link means being rigidly connected with said hydraulic piston, and said biasing means is tensioned between said projection or pin and said link means.

6. Automatic brake gap adjuster assembly as claimed in claim 5, wherein said link means is formed with fork fingers at its one end for slidably engaging said projection pin.

7. A wheel brake cylinder assembly comprising a hydraulic wheel cylinder having at least one actuating piston disposed therein and movable relative thereto, an adjusting nut rotatably mounted in said hydraulic wheel cylinder, ratchet teeth formed on a wheel part rigid with said nut, an adjusting bolt coaxially and threadedly engaging in and with said nut, the outer end of said bolt adapted to be disposed in operating engagement with a brake shoe, an L-shaped lever pivotably mounted on said wheel cylinder, one of the free ends of said lever being resilient and disposed in engagement with said ratchet teeth for rotating said nut upon pivotal movement of said lever, a connecting lever having one end operatively connected with said actuating piston for performing unitary movement therewith, while the opposite end of said connecting lever is disposed in engagement with the other end of said adjusting lever for drivingly rotating the latter in one rotational direction only, and a spring operatively connecting said adjusting lever with said connecting lever.

* * * * *